Figure 1:
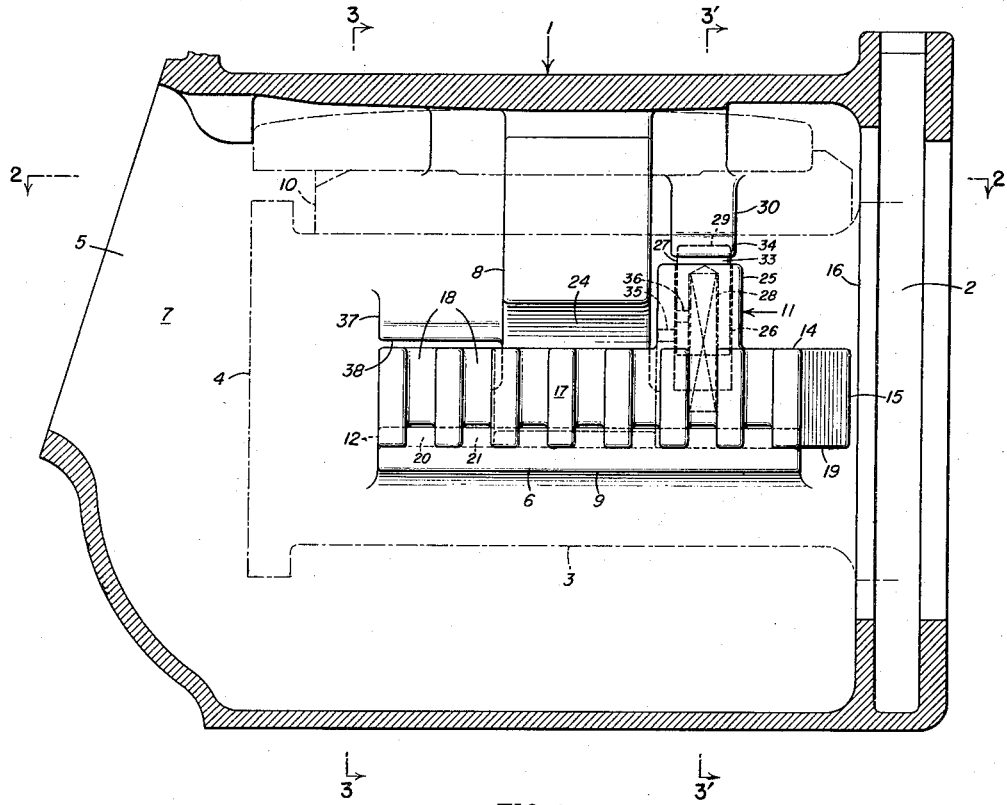

Jan. 10, 1961 E. H. BLATTNER ET AL 2,967,742
JOURNAL BOX
Filed May 13, 1958 2 Sheets-Sheet 1

Inventors:
EMIL H. BLATTNER, DECEASED,
BY ELIZABETH BLATTNER, EXECUTRIX.
DONALD G. SYMER
By Wilmer Mechlin
their Attorney Inventors:
EMIL H. BLATTNER, DECEASED,
By ELIZABETH BLATTNER, EXECUTRIX,
DONALD G. SYMER By Wilmer Mechlin
their Attorney

United States Patent Office 2,967,742
Patented Jan. 10, 1961

2,967,742

JOURNAL BOX

Emil H. Blattner, deceased, late of Williamsville, N.Y., by Elizabeth Blattner, executrix, Rochester, N.Y., and Donald G. Symer, Lancaster, N.Y., assignors to Symington Wayne Corporation, Salisbury, Md., a corporation of Maryland Filed May 13, 1958, Ser. No. 734,929

9 Claims. (Cl. 308—38)

This invention relates to journal boxes of the solid bearing type.

In recent years, it has become apparent that the instability of the components of a solid bearing journal box under sudden stops and other severe service conditions sufficient to displace a journal laterally relative to the journal box, plays a primary role in the occurrence of hot boxes. It also has been recognized that the incidence of hot boxes can be decreased substantially by retaining the waste in the lower part of a journal box. As a result, there has been a rash of developments designed to produce component stability by limiting the permissible lateral play between journal and journal box and to retain the waste by use of mechanical means in the journal box, substituting a lubricating pad for the conventional loose waste or, ofttimes, both.

For some years, waste retainer ribs have been an A.A.R. alternate standard for solid bearing journal boxes and with the experience gained in the use of such ribs and journal stops, the A.A.R. now proposes that waste retainer ribs be a mandatory standard and that the standard form of rib be adapted for use with a separate journal stop holdable in position without being secured to the journal box. No prior device satisfactorily meets these specifications. On the contrary, probably the most successful device now on the market, the Magnus "R–S" journal stop, would be outlawed by the standardization, since bolted in place and installable only after retaining ribs, such as those proposed, have been at least partially burned off.

It is the primary object of the present invention to provide an improved solid bearing journal box and associated journal stops which not only meet the proposed A.A.R. specifications in construction, but retain all of the advantages of the best of prior devices in operation.

Another object of the invention is to provide a solid bearing journal box and journal stops of such construction and arrangement that the journal stops are supported on waste retaining ribs integral with the box and, while readily removable, are held in place under all service conditions without being bolted or otherwise secured to the box.

An additional object of the invention is to provide an improved construction of solid bearing journal box and journal stops whereby the journal stops are yieldably held against accidental dislodgment.

A further object of the invention is to provide an improved solid bearing journal box incorporating integral waste retainer ribs and useful without modification, either with or without associated removable journal stops.

Another object of the invention is to provide an improvement in solid bearing journal box construction which not only meets the proposed A.A.R. specifications as to integral waste retainer ribs, but presents no difficulty in casting.

Figure 2:
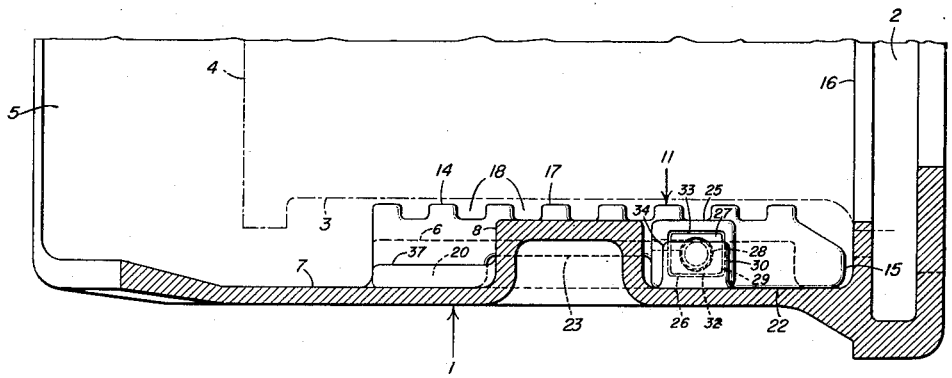
Figure 3:
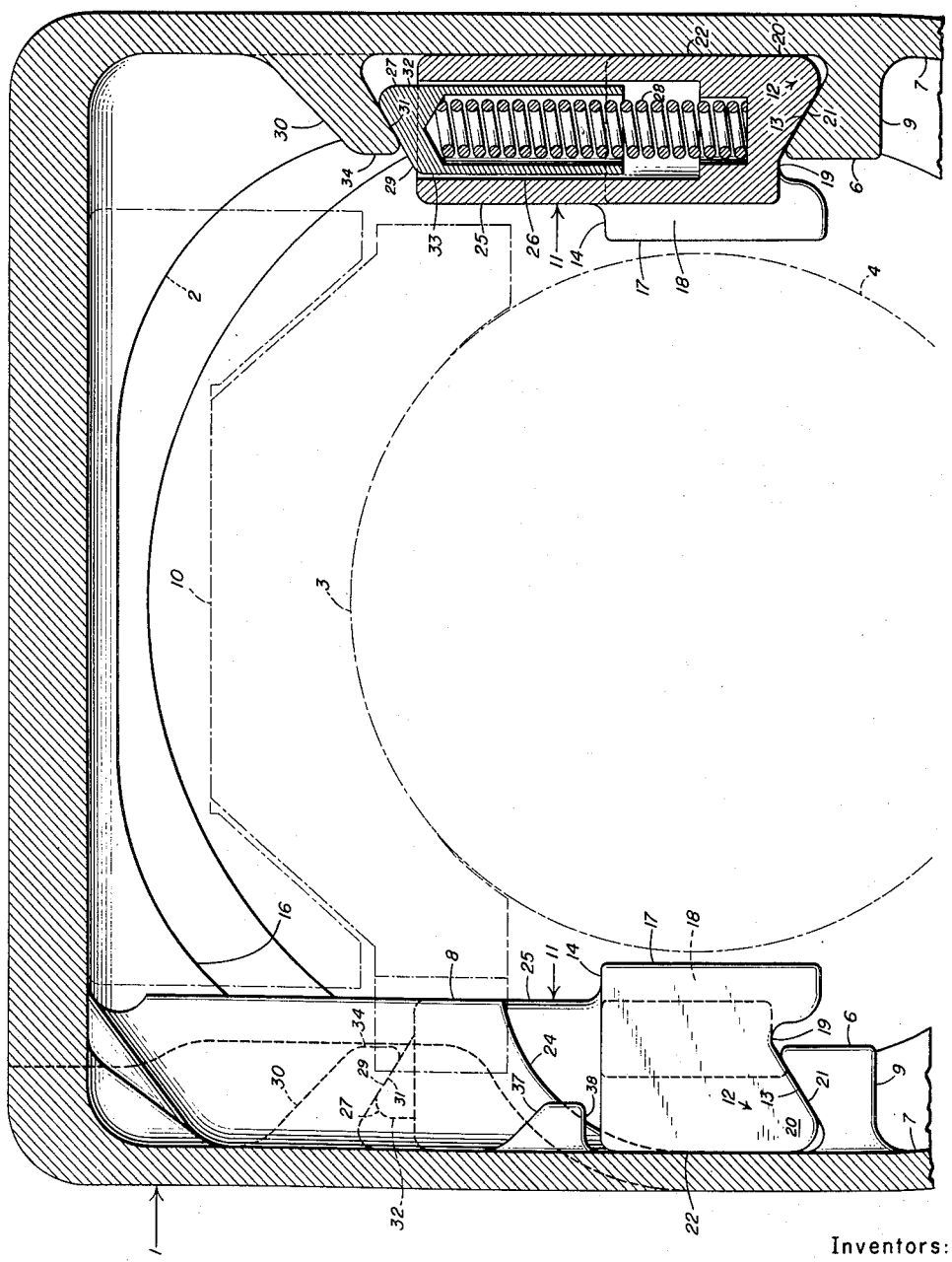

Other objects and advantages of the invention will appear hereinafter in the detailed description, be particularly pointed out in the appended claims and be illustrated in the accompanying drawings, in which:

Figure 1 is a vertical sectional view of a journal box embodying a preferred form of the retaining ribs and journal stops of the present invention;

Figure 2 is a fragmentary horizontal sectional view taken along the lines 2—2 of Figure 1; and Figure 3 is a vertical sectional view taken at the left along the lines 3—3 of Figure 1 and at the right along the lines 3'—3' of that figure.

Referring now in detail to the drawings, in which like reference characters designate like parts, the improved structure of the present invention is applicable to any solid bearing journal box, whether made integral with a side frame or separate for assembly with a jaw-type side frame. For purposes of illustration, it has been applied to an otherwise conventional solid bearing journal box 1 open at the rear through a dust guard-receiving slot 2 for receiving a journal 3 at one end of an axle 4 and having the usual front opening 5 normally closed by a lid (not shown).

The improved structure of the present invention is comprised of a pair of substantially horizontal and parallel retaining ribs or ledges 6, each integral with and instanding from one of the side walls 7 of the journal box below the usual brass lug 8 and extending longitudinally of the journal box beyond the brass lug toward either end of the side wall. Disposed at a level below the center line of the axle 4 and within the longitudinal or axial limits of the journal 3 when the latter is inserted in the journal box 1, each of the waste retainer ribs 6 has a substantially flat or planar lower face 9 disposed to block shifting or rotary movement of either loose or padded waste upward along either of the side walls 7 into contact with the solid journal bearing 10 and thus serving to retain the waste in the lower part or portion of the journal box. Designed to support the journal stops 11 of this invention, each of the ribs 6 has a groove or upwardly concave seat 12 extending along its upper face and preferably formed by under bevelling the horizontally extending upper face 13 of the rib so that, transversely of the journal box, that face slopes downwardly or declines toward the side wall 7 from which the rib instands.

Each of the pair of counterpart journal stops 11 has a substantially block- or box-shaped body 14 which conveniently may be made of brass or like bearing metal and preferably is of greater length than the supporting rib 6 so as, when in position, to extend or project rearwardly beyond the rib and have its rear end 15 contiguous or adjacent the inner rear wall 16 of the journal box. The inner or journal-confronting surface 17 on the body 14 of the journal stop 11 normally will be spaced from the journal 3 and, in the manner of the Magnus "R–S" journal stop, preferably is substantially flat and vertical and interrupted by a plurality of longitudinally spaced, vertically extending slots 18 for passage of lubricant to the bearing 10. To fit them in the grooves or upwardly concave seats 12 along the ribs 6, here formed by the upper faces 13 of the ribs and the adjoining portions of the side walls 7, each of the journal stops 11 has, on or depending from the underside 19 of its body 14, a tongue 20, conveniently formed by undercutting the body and having an undersurface 21 declining or sloping downwardly toward the vertically disposed outer surface 22 of the body 14 at an inclination or slope corresponding to that of the upper face 13 of the related rib 6. Interfitting or mating with the groove 12 along the related rib 6, the tongue 20 not only inhibits transverse dislodgment of the journal stop but, because of the decline of the engaging undersurface 21 and upper face 13 of the preferred embodiment, causes the outer surface 22 of the journal stop to be wedged against and backed by the adjoining or associated side wall 7.

Limited in relative longitudinal movement, rearwardly of the journal box, by the proximity to the latter's inner rear wall 16 of its rear end 15 and apertured or slotted vertically intermediate its ends, as at 23, to accommodate and straddle the conventional reinforcing web 24, depending from the brass lug 8, the journal stop 11 may be limited in forward longitudinal movement relative to the journal box by a housing, casting or abutment 25 integral with and upstanding or projecting upwardly from the body 14 intermediate its web-receiving aperture 23 and rear end 15. However, the primary function of the housing 25 is to house in an upwardly opening socket 26 of rectangular or other non-circular cross-section, an upright or vertically disposed plunger or latch 27 of corresponding cross-section and yieldably urged upwardly by a coil spring or like spring means 28 contained in the housing.

Confronting the nose or upper end 29 of each plunger 27 and spaced correspondingly above the rib 6 and, here, to the rear of the related brass lug, is a catch lug or catch 30 integral with and instanding from the adjoining side wall 7 of the journal box. While both the nose 29 of the plunger 27 and the underface 31 of the catch lug 30 have the same bevel, inclination or slope, contrary to that of the conventional latch, the nose is bevelled or inclines or slopes upwardly toward the outer side 32, rather than toward the inner side 33 of the plunger and the underface 31 of the catch lug 30 is correspondingly under bevelled relative to the adjoining side wall. Thus, when, during installation, one of the journal stops 11, initially canted to clear the related catch lug 30 and with its tongue 20 seated in the groove 12 along the related rib 6, has its upper end swung about the tongue toward the adjoining side wall 7, the plunger will confront the outer end 34 of the catch lug with its flat outer side 32, requiring the plunger initially to be retracted, as by a locking pin (not shown), extending through alignable holes 35 and 36 in the housing and plunger, respectively. But once inside or within the outer end 34 of the catch lug, the plunger, by engagement of its nose 29 with the catch lug's undersurface 31, will urge the upper part of the journal stop 11 toward the adjoining side wall 7 and thereafter cooperate with the tongue 20 to wedge or hold the outer surface 22 of the journal stop against the side wall. Thus exerting a constant pressure to hold or lock the journal stop 11 in position, the plunger 27, under force of the spring 28, not only prevents accidental dislodgment of the journal stop, but keeps it from rattling, a spring pressure on the order of 50 pounds being adequate for both purposes.

While the plunger or yieldable latch member 27, by its engagement with the catch lug or member 30, will suffice to releasably lock the journal stop 11 in place under normal or even severe service conditions, any possibility of accidental dislodgment of the journal stop from its seat 12 is readily avoidable by providing, integral with each side wall 7, at the opposite side of its brass lug, a stop lug 37 having a shoulder 38 paralleling and confronting the corresponding portion of the related rib 6. Spaced above the upper face 13 of the related rib 6, each shoulder 38, also, normally will be spaced above the body 14 of the journal stop but with the vertical clearance therebetween insufficient to permit the journal stop to move upwardly to the point where its tongue 20 would clear its seat 12 along the related rib 6. While preventing vertical dislodgment of the journal stops, this clearance permits the journal stops readily to be installed by initially canting and subsequently rocking or swinging in the manner previously described.

From the above detailed description, it will be apparent that there has been provided an improvement in solid bearing journal boxes which not only provides a journal box with integral waste retainer ribs for holding waste in its lower portion, but enables the journal box, without further modification, to be fitted with journal stops releasably lockable without bolts or other securing means in seats along the waste retainer ribs. It should be understood that the described and disclosed embodiment is merely exemplary of the invention and that all modifications are intended to be included which do not depart from either the spirit of the invention or the scope of the appended claims.

What is claimed is:

1. In a solid bearing journal box, the combination of a pair of waste retainer ribs instanding from opposite side walls of said journal box, a pair of journal stops each supportable by and seatable in a seat along one of said ribs, and yieldable latch means acting between said box and each of said stops for releasably locking said stops in position.

2. In a solid bearing journal box, the combination of a pair of waste retainer ribs instanding from opposite side walls of said box, an upwardly concave seat along each of said ribs, a journal stop seatable in each of said seats, and yieldable latch means acting between each of said stops and said box for releasably locking said stops in said seats.

3. In a solid bearing journal box, the combination of a pair of waste retainer ribs instanding from opposite side walls of said box, an upwardly concave seat along each of said ribs, a journal stop seatable in each of said seats, a catch instanding from each of said side walls above said ribs, and a spring-pressed latch carried by each of said journal stops and engageable with one of said catches for locking said journal stops in said seats.

4. In a solid bearing journal box, the combination of a pair of waste retainer ribs instanding from opposite side walls of said box, an upwardly concave seat along each of said ribs, a journal stop seatable in each of said seats, a catch instanding from each of said side walls above and having an under bevelled underface confronting the seat along the related of said ribs, and a spring-pressed latch having a nose bevelled in correspondence and engageable with said underface of one of said catches for releasably locking said journal stops in said seats.

5. In a solid bearing journal box, the combination of a pair of waste retainer ribs instanding from opposite side walls of said box, an upwardly concave seat along each of said ribs, a journal stop seatable in each of said seats, a catch instanding from each of said side walls above and having an under bevelled underface confronting the seat along the related of said ribs, a housing integral with and upstanding from each of said journal stops and containing an upwardly opening socket, an upright plunger in each of said sockets, and spring means in each of said sockets and acting upwardly on the associated of said plungers, each of said plungers having a nose bevelled in correspondence and engageable with the underface of a confronting of said catches for releasably locking said journal stops in said seats.

6. In a solid bearing journal box, the combination of a pair of waste retainer ribs instanding from opposite side walls of said box, an upwardly concave seat along each of said ribs, a journal stop seatable in each of said seats, a catch instanding from each of said side walls above and having an under bevelled underface confronting the seat along the related of said ribs, a housing integral with and upstanding from each of said journal stops and containing an upwardly opening socket of non-circular cross-section, an upright plunger of corresponding cross-section in each of said sockets, and spring means in each of said sockets and acting upwardly on the associated of said plungers, each of said plungers having a nose bevelled in correspondence and engageable with the underface of a confronting of said catches for releasably locking said journal stops in said seats.

7. In a solid bearing journal box, the combination of a pair of waste retainer ribs instanding from opposite side walls of said box, an upwardly concave seat along each of said ribs, a journal stop seatable in each of said seats, a catch instanding from each of said side walls at one side of a brass lug thereon and disposed above and having an under bevelled underface confronting the seat in the related of said ribs, a spring-pressed plunger carried by each of said journal stops and having a nose bevelled in correspondence and engageable with the underface of a confronting of said catches for releasably locking said journal stops in said seats, and a stop lug instanding from each of said side walls at the other side of said brass lug, each of said stop lugs normally being spaced above and limiting upward movement of the associated of said journal stops for preventing dislodgment of said stop from its seat except by outward swinging thereof relative to the adjoining side wall.

8. In a solid bearing journal box, the combination of a pair of horizontally extending waste retainer ribs instanding from opposite side walls of said box and extending therealong beyond opposite sides of a brass lug thereon, an under bevelled upper face on each of said ribs and forming with a contiguous portion of the adjoining side wall an upwardly facing concave seat, a journal stop supported on each of said ribs and having a depending tongue bevelled in correspondence with said upper face and seatable in said seat, said journal stops being of greater rearward extent than said ribs and having rear ends terminating adjacent an inner rear wall of said box for limiting rearward movement of said brass lugs relative to said ribs, each of said stops being apertured intermediate ends thereof and straddling the related of said brass lugs, a catch instanding from each of said side walls intermediate said rear wall and the associated of said brass lugs, each of said catches having an under bevelled underface confronting the upper face of the adjoining of said ribs, a housing upstanding from each of said journal stops intermediate said rear end thereof and the brass lug straddling aperture therein and engageable with the related of said brass lugs for limiting forward movement of said journal stop along the associated of said ribs, each of said housings containing an upwardly opening socket of non-circular cross-section, an upright plunger of corresponding cross-section seated in each of said sockets and urged by spring means therein upwardly relative thereto, and a nose on each of said plungers bevelled in correspondence and engageable with an under face of a confronting of said catches, said plungers cooperating with said tongues for releasably locking said journal stops in said seats.

9. In a solid bearing journal box, the combination of a waste retainer rib instanding from each side wall of said box and having an under bevelled upper face, a catch lug instanding from each side wall at one side of a brass lug thereon and having an under bevelled underface confronting and spaced above the upper face of the associated rib, and a stop lug instanding from each side wall at the other side of the brass lug thereon and having a shoulder confronting and spaced above the upper face of the related rib for rocking insertion of a journal stop therebetween.

References Cited in the file of this patent

UNITED STATES PATENTS

| | | |
|---|---|---|
| 1,941,486 | Pilcher | Jan. 2, 1934 |
| 2,112,206 | Clavery | Mar. 22, 1938 |
| 2,657,102 | Johnson | Oct. 27, 1953 |